Nov. 3, 1964     E. M. MEYER     3,155,778
TEACHING APPARATUS USING SOUND RECORDING
Filed March 3, 1961     5 Sheets—Sheet 1

EDWARD M. MEYER
INVENTOR.

BY Homer R. Montague
ATT'Y.

Nov. 3, 1964 E. M. MEYER 3,155,778
TEACHING APPARATUS USING SOUND RECORDING
Filed March 3, 1961 5 Sheets-Sheet 3

Fig. 6

INVENTOR:
EDWARD M. MEYER
BY
Homer R. Montague
ATTY.

Nov. 3, 1964           E. M. MEYER           3,155,778

TEACHING APPARATUS USING SOUND RECORDING

Filed March 3, 1961           5 Sheets—Sheet 4

INVENTOR:
EDWARD M. MEYER
BY Homer R. Montague
ATT'Y.

Fig. 9

United States Patent Office

3,155,778
Patented Nov. 3, 1964

3,155,778
TEACHING APPARATUS USING SOUND
RECORDING
Edward M. Meyer, Silver Spring, Md.
(5708 Tanglewood Drive, Bethesda, Md.)
Filed Mar. 3, 1961, Ser. No. 93,186
5 Claims. (Cl. 179—100.2)

This invention has to do with the teaching of students, and particularly deals with apparatus, and methods, for aiding in the teaching of material or subjects best learned by oral imitation, repetition, memory, or mimicry. The teaching of speech to the deaf or hard of hearing is a closely related object.

It is recognized in the teaching profession that the actual repetition by a student, of oral information received from an instructor, greatly speeds the learning process. While this is true of many subjects, including for example the learning of a multiplication table or the memorizing of any body of facts such as historical facts, or any information which can be imparted orally, the benefits of actual student repetition are especially evident in the teaching of spoken languages. In this case, the necessity for learning a vocabulary, as well as the correct pronunciation of foreign words and sounds, makes oral repetition valuable both as a memory aid and as affording an opportunity for critical review or supervision of the student's attempts to mimic the instructor.

The ideal situation, in which an instructor teaches and supervises (or monitors) a single student or a very few students, has become increasingly uneconomical and impractical. It has been found that the benefits of self-review or self-monitoring of oral responses are very worth while, and since lecture or instructive material can readily be addressed (either in person or by using records) to a very large group, this principle of self-review makes the teaching, particularly of speech or languages, possible for large classes in a very efficient manner.

It has heretofore been proposed to achieve a language-laboratory operation of the above type by providing each student with an individual sound recorder and reproducer, by which his responses to instruction can be recorded and then played back to his own ears for self-review purposes. Since magnetic tape recording equipment offers well known practical advantages for such use, it has been widely adopted. The operation usually involves the presentation of teaching material to all students in a class (either from a teacher or a pre-recorded sound tape), the periodic recording of a trial response by each student in his own machine, and the playback of such response to his ears alone. Available equipment for such use has great disadvantages, among which are the operational complexity and cost of the student machines. But the most serious disadvantages, from the teaching psychology standpoint, are the distracting effect of the necessary manual manipulation of the machine by the student, and the delay involved in rewinding a record tape before his response can be reviewed or reiterated. What is required is equipment, and a method of using it, which will present to the student (whether alone or as a member of a group) the reproduction of his own response without any considerable conscious effort, and with a minimum of delay.

The present invention satisfies the above requirements by utilizing a record handling technique which is entirely foreign to the notion of reversing a sound record as a preliminary to a rapid review; it also provides for automatic metering control, whereby exactly the material just recorded will be reproduced, without appreciable delay, and without the necessity of distracting the student's attention by such requirements as estimating the proper amount of rewind.

In brief, the invention accomplishes its aims by providing for the separate advancing of a record tape past a recording head and a playback or reproducing head at successive respective intervals of time, rather than as a single concomitant operation. By feeding the tape through the recorder head, but diverting it in a path that does not immediately pass through the playback head, the tape is available for immediate playback the instant it is allowed to begin to pass the playback head. Moreover, if the exhaustion of the tape in the diverted path (in temporary storage, as it were) is made to re-commence (in an automatic manner) the feeding of a new tape portion past the recording head, the use of dual-track tapes with a pre-recorded instruction track becomes very practical, because the student will establish his own response and review time requirements, and need not suffer the waste of time heretofore involved in programming an instruction tape for average or maximum response and review times. The invention encompasses several forms of apparatus accomplishing these aims, both for individual and class use, of simple and economical construction and which operate with a minimum of distraction; their common novel characteristic being the seperation of tape movements related to the recording (response) function from those movements related to the playback (review) function.

*First Embodiment*

Figure 1:
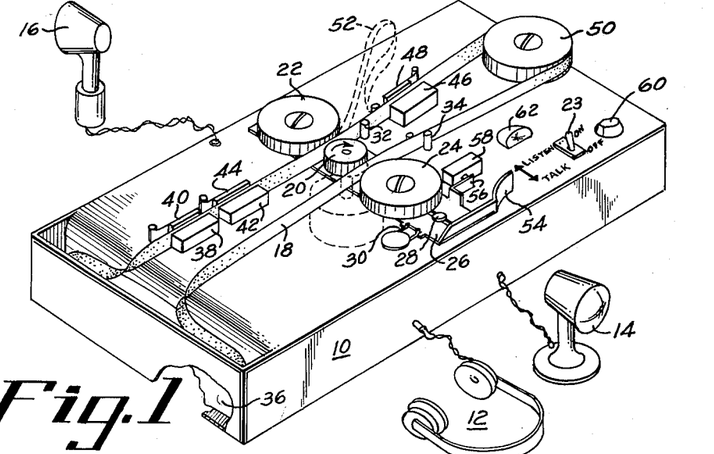
FIG. 1 is a perspective view of one form of student equipment embodying the new principles of the invention.
Figure 2:
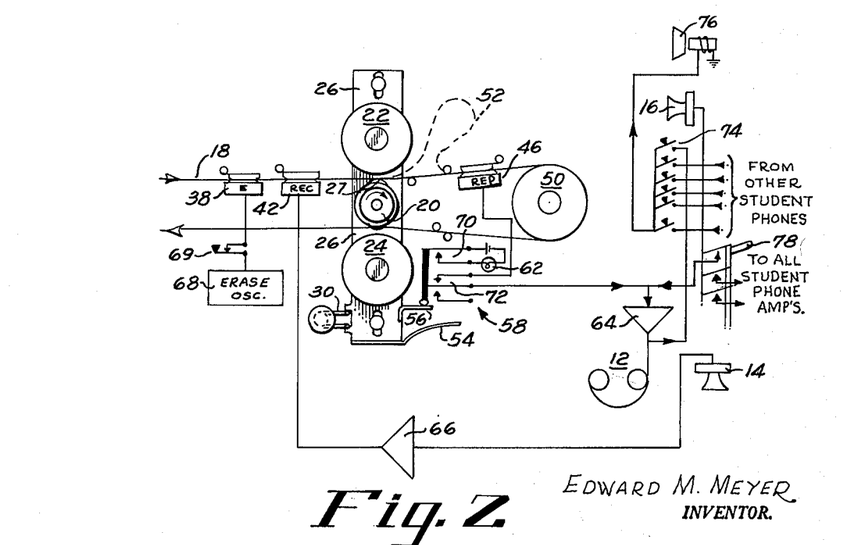
FIG. 2 is a schematic view of the same, including the schematic wiring of the electrical components.

Referring first to FIGS. 1 and 2 of the drawings, numeral 10 designates a single chassis or housing incorporating the entire equipment for one student (who may be a member of a large class), with the student's earphones 12 and student's microphone 14. Numeral 16 designates the instructor's microphone (multipled to all students in a class) for a "live" or instructor-present class. The instructional material may, of course, be transmitted to each student from a single pre-recorded tape.

In the form of the invention now being described, review is required for passages of some length, but it is not desired to store the responses for future review. Hence an endless (spliced) magnetic record tape 18 is employed, but supply and take-up reels could equally well be provided, with slight additional complication. In either event, the actual feeding of tape is in one direction only, no rewinding being required between the making of the student's response and his review (reiteration or playback) thereof. To this end, there is provided the friction drive capstan 20, constantly rotated in the direction of its arrow, whenever the apparatus switch 23 is "on." However, in the condition illustrated, the tape is not in motion, because both of the two pressure rollers 22 and 24 are out of contact with the tape. These pressure rollers, made with rubber drive surfaces for example, are journalled on a shift plate 26 slidable on the top or deck of chassis 10 (by virtue of guides such as slots in the plate cooperating with headed rivets such as at 28) and biased by hairpin spring 30 (engaging lugs on the shift plate) to a central position in which both rollers 22 and 24 are out of contact with and away from capstan 20, leaving gaps at its opposite diametrical faces through which the tape 18 is threaded. Guide pins or rollers as at 32, 34 control the lateral tape position. Plate 26 is slotted (at 27 in FIG. 2) to pass about the shaft of capstan 20.

To provide convenient accommodation for a tape 18 of moderate length, chassis 10 includes a tape bin 36, from which tape passes over an erase head 38 with its pressure shoe 40, a recording head 42 with its pressure plate 44, and thence between capstan 20 and pressure roller 22 to a playback or reproduce head 46 with its pressure plate or shoe 48. Thence the tape wraps about an idler pulley 50, and returns between capstan 20 and pressure roller 24. Heads 42 and 46 are placed as close as possible to the contact point between capstan 20 and roller 22; the spacing is exaggerated in FIG. 1 for clarity.

All of the pressure shoes are adjusted so as to maintain tape 18 taut, but without unnecessary drag, when roller 24 is urged against capstan 20 to feed the tape. However, when roller 22 engages the capstan, the tape flows into the free or storage loop indicated by dash lines at 52, and hence does not travel over the playback head 46 at this time. When the roller 24 thereafter presses toward the capstan, the tape in this open loop is pulled past playback head 46, and when the loop is exhausted tape is again pulled past both of heads 38 and 42. As will appear below, the operation of plate 26 could be controlled by one or more solenoids either by the student, the teacher or a master tape.

Shift plate 26 is manually shifted in FIGS. 1 and 2, as by a hand grip 54 integral with the plate. A lug 56 on the plate also operates a switch 58 when the plate is moved, as described below. A volume control knob 60 may be provided to control the gain of the playback amplifier to be described, and an indicator "talk" lamp 62 may be located as shown to assure the student that he has operated grip 54 in the proper direction to record his response to the instruction received by him.

The functioning of the parts will best be understood by a description of the operation in a typical instance, referring to FIG. 2. The shift plate 26 is in its neutral, non-feeding, position, and the instructor is reciting a passage to be learned, by talking into his microphone 16. His voice signals reach the student via the latter's playback amplifier 64 and headphones 12. Upon completion of the instruction, the student operates hand grip 54 to the "Talk" position (downward in FIG. 2) which brings pressure roller 22 against the tape 18 at capstan 20, and tape thereupon feeds into the open loop 52. At the same time, the student begins to make his response, via his microphone 14, amplifier 66 and record head 42. The erase head 38 is constantly energized from the conventional erase oscillator 68, so that the response of the student is always recorded on clean tape in loop 52. In case it is desired to preserve the tape for later review, the erase circuit can be de-energized by opening switch 69.

The downward movement (FIG. 2) of grip 54 lights the "talk" lamp 62 to assure the student that he will be making the desired response record; contact 70 of switch 58 performs this function. Whenever the response has been completed, the student merely moves grip 54 fully in the opposite direction (upward in FIG. 2). Lamp 62 is extinguished. Pressure roller 24 is brought against the lower reach of tape 18 and presses it against capstan 20, which feeds the (recorded) tape from loop 52 past playback head 46. The latter is connected by contacts 72 of switch 58 to the amplifier 64, and thus the "review" signals reach the student headphones 12. When the student has monitored his effort, he releases grip 54 to restore plate 56 to its neutral or center position, and awaits a subsequent instruction.

FIG. 2 also illustrates useful auxiliary features especially for classroom use; a set of push key switches 74 at the instructor's position allow him to monitor the "review" signals of any selected student of a class, or each of them in turn; the selected headphone signals are thus momentarily and individually coupled to speaker 76 (or headphones) for the instructor. A common key switch 78 also at his location allows the instructor to connect his microphone 16 to all the amplifiers 64, so as to reach all of the students' headphones when desired, and whether or not any student may then also be listening to his previous recording. This switch 78 is the one which will normally be "on" (closed) when the instructor is reciting the instructional material, but can obviously be employed for corrective instruction if his monitoring or sampling of the students' (or student's) responses indicates such to be desirable.

*Second Embodiment*

Figure 3:
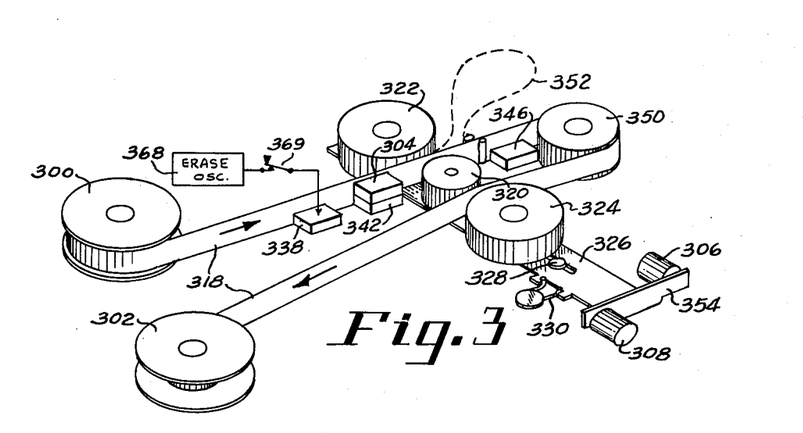
FIG. 3 is a perspective view of a modified student equipment, for dual-track applications.
Figures 4, 5:
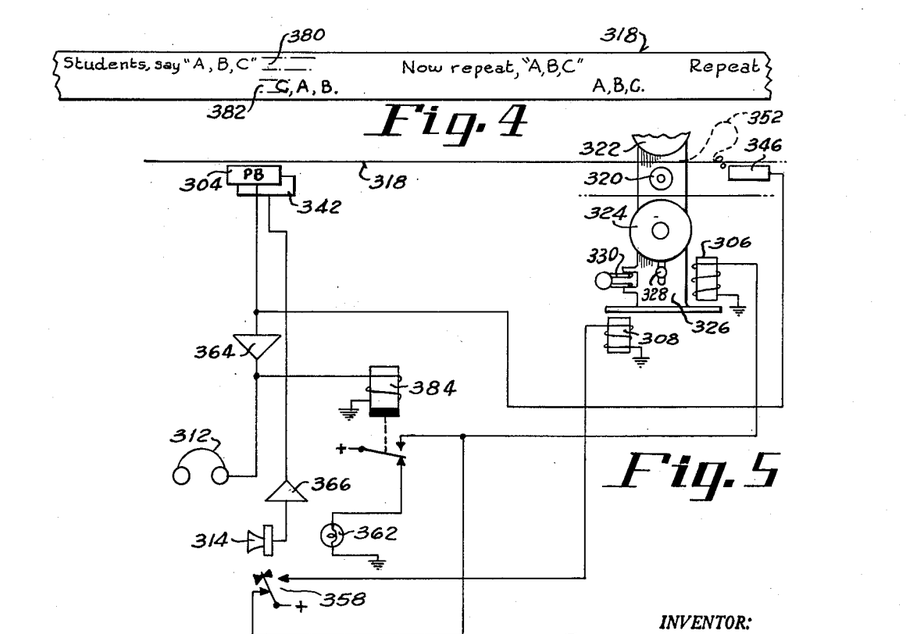
FIG. 4 is a diagram of a typical arrangement of signals on a dual track tape.
FIG. 5 is a schemaic and wiring diagram of the equipment of FIG. 3.

Turning now to the modified form of the invention shown in FIGS. 3, 4 and 5 of the drawings, it will be noted that parts generally equivalent to those of the first form have been designated by reference numbers prefixed with the numeral "3," while parts having no correspondence have been given numbers in the three-hundred series which were not thus used. In this form, certain variations mentioned above as applicable to the first form have also been concretely illustrated.

Thus, instead of the spliced or endless tape 18, there is shown a tape 318 which unwinds from a supply spool 300 onto a take-up spool 302, these being non-positively driven from the same motor (if desired) as drives the constant-speed capstan 320. Tape 318 is shown as having two vertically-spaced tracks 380 and 382 (FIG. 4), the upper track 380 having pre-recorded thereon signals constituting the instructional material. In order to make the literal representation of typical signals readable, the typical texts are shown in FIG. 4 as reading from left to right, but it will be appreciated by those skilled in the art that with a tape moving in the direction of the arrow thereon in FIG. 3, or from left to right past the magnetic heads, the actual signals on the tape would progress from right to left in FIG. 4.

FIG. 4 shows the track 380 as commencing, the section illustrated, with a recording of the instructor's voice saying "Students, say A, B, C," followed by sufficient blank tape to allow time for the students to do so. The record of the student's response is made on the lower track 382, and it will be noted that an incorrect response has been shown, the student having wrongly said "C, A, B." Both tracks now contain sufficient blank tape to permit the student to hear his own (incorrect) response as will be described, after which the instructor's track 380 contains the admonition "Now repeat, A, B, C." The student (correctly this time) says "A, B, C" which is recorded as shown on track 382, and again sufficient clear tape is allowed for him to hear this correct response, and so on. It may be observed that the time which the one preparing the tape must allow between instructions is somewhat greater than twice the iteration time of the part of the instruction which is actually to be mimicked. The mechanization of a master recorder to accomplish this requirement automatically will be described below in connection with a further embodiment of a more elaborate machine.

Returning now to FIG. 3, the tape 318 passes an erase head 338 here shown as positioned and dimensioned as only to erase the lower track on the tape, or to leave it for later review by opening switch 369 in the circuit from erase oscillator 368. A full-width erase head could be used if it were not desired to retain for re-use even the upper or instruction track 380. Instead of the full-width recording head 42 of the earlier form, this form now presents to the tape the vertically-stacked separate playback or reproduce head 304 (for instructions) and recording head 342 (for responses) placed as close as possible to the bite position between capstan 320 and pressure roller 322. After suitable guide pins or rollers to cause the production of a free loop 352 when required, the tape passes a second reproduce head 346 (for review by the student), thence about idler 350 and back through the bite position between capstan 320 and pressure roller 324. As before, the pressure rollers are journalled on a plate 326 with its guide and neutral-position spring means appropriately numbered, but in this case the plate 326 is arranged to be shifted from neutral to its end positions by a pair of solenoids 306 and 308, operating on a plate extension 354 which is made of iron or material suitable for such operation.

The operation of this embodiment of the invention is almost self-evident, but will be outlined in connection with FIG. 5, which illustrates a suitable control circuit. With the capstan energized but plate 326 in its center or neutral position, no tape feed occurs, and the tape is assumed tightly threaded about the rollers as shown, there being no loop at 352. When the student is ready to commence, he operates his switch 358 to its left contact (as shown), and power is supplied from + to the solenoid or magnet 306, which draws the plate 326 up (in FIG. 5) and feeds the tape by the contact of roller 324 against the tape and thus urging it into contact with the capstan. In the circuit shown, it is unnecessary for the student to hold switch 358 in the left position, for as soon as instruction signals flow through playback head 304 and amplifier 364, relay 384 picks up and supplies power from + to the solenoid 306, holding the latter operated even if switch 358 now opens. Relay 384 is of the slow-release type so that it remains operated during short (syllabic) pauses in the instruction signals, but will release a short time after the instruction has been completed. Equivalent time-delay circuits or devices for this kind of function can be substituted. A typical release-delay time for this purpose would be one second, for example.

When the instruction signals do cease, relay 384 will drop out, and solenoid 306 will be de-energized to return plate 326 to its neutral position. The release of relay 384 also applies voltage to the student lamp 362, through its normally-closed "back" contact, to advise the student that the response may now be made. The student thereupon operates switch 358 to the right and commences his response ("A, B, C"), which is recorded over amplifier 366 and recording head 342, and voltage is applied from + to solenoid 308, which pulls pressure roller 322 downward, and feeds tape 318 into the open loop 352 of FIG. 3. When the response is completed, the student again throws switch 358 to the left, and pressure roller 324 is again forced against the tape and capstan, and the student hears his response over the playback head 346 and amplifier 364. As in the previous cycle, signals from the response playback 346 hold relay 384 operated until they have been completed. It will be noted that if the switch 358 has in the meantime been allowed to return to its center position, contacting neither of its end contacts, the cessation of review signals from head 346 will merely allow relay 384 to release and the tape will stop, neither solenoid 306 or 308 being energized. But if the switch 358 had been held to the left, solenoid 306 would have remained energized, and tape would be fed to commence the playback through head 304 of the succeeding instruction. The same action woul occur if the blank tape between the student's response playback completion and the commencement of the succeeding instruction signals was very short, shorter than that corresponding to the release time of relay 384. In either event, the commencement of the succeeding instruction does not occur until the completion of the student's review of his response.

Figure 6:
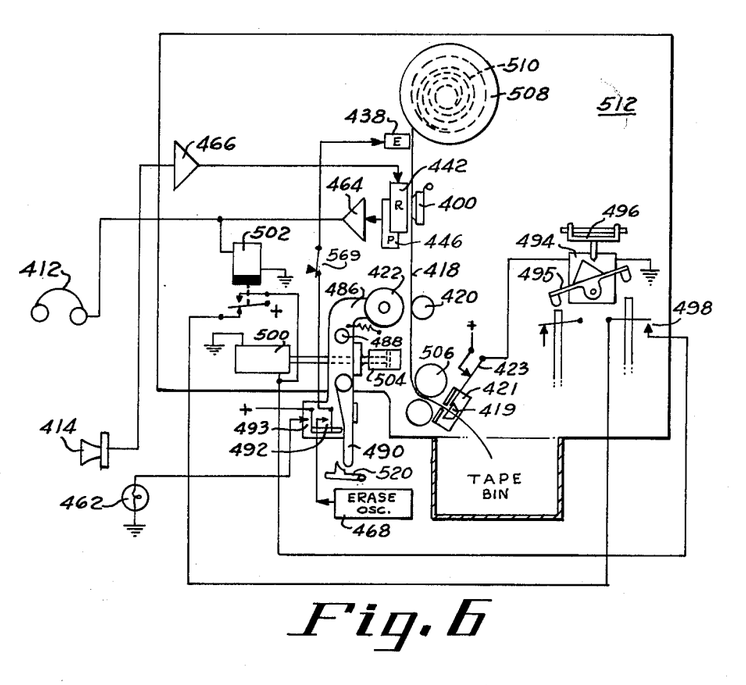
FIG. 6 is a view in elevation, with wiring connections in schematic form, of another possible embodiment of the invention.

The FIGURE 6 Embodiment

FIG. 6 shows schematically a somewhat different way of handling the record tape in a quick-review type of recorder-reproducer, and one which is believed to have definite advantages wherever a short-term record must be made and immediately reproduced; for example, for short-term vocal memorandum purposes. As there shown, a mechanism plate (which may be vertically positioned) carries journalled thereon a tape reel 508 constantly urged in one direction by a clock-spring drive (roller curtain drive) 510, the tape 418 extending past closely contiguous head 442 and playback head 446, both positioned to cooperate with a single signal track on the tape, and as close to one another, in the direction of tape travel, as possible. The identical head may be used, with suitable switching thereof, as well known in the art.

From these heads and their pressure-plate 400, the tape extends idly past a motor-driven capstan 420, around guide rollers 506, and through a guide and stop slit in a bracket 421 secured to plate 512. An enlarged stop element, secured to the tape, prevents this amount of the tape from being rewound on the reel 508, so that it remains constantly threaded as described. In the "rest" position shown, the stop element 419 is pulled by clock spring 510 against the operating contact arm of a switch 423, closing the switch contact to a source of voltage at +. When tape feeds downwardly from the position shown, it may be received in a tape bin, as illustrated.

Feeding of tape downwardly past the record-reproduce heads is done by urging the tape against capstan 420 by a pressure roller 422 journalled on an arm 486 pivoted on plate 512 at 488, the arm being urged counter-clockwise by a spring. The arm 486 can be swung clockwise to feed tape by a handle 490 in turn pivoted on the arm and positioned against a stop lug on the arm, and held against it as by the spring pressure of a switch including normally open contact sets 492 and 493. The spring action on handle 490 is preferably a little stronger than that urging arm 486 counter-clockwise, so that the contacts are engaged only after roller 422 causes the feeding of tape. A one-way delay dashpot 504 keeps arm 486 from being urged too violently towards tape 418 when the handle is moved; i.e., the dashpot may have a regulated check valve operating in the engagement direction only.

Numeral 494 designates the operating coil of a latch-type relay of a well known kind whose rocker-arm 495 is moved from leftmost to rightmost positions and back upon successive energizations of the coil, due to the action of its armature through a flexible operator upon (for example) an inverted V-shaped portion of the rocker arm. Thus contacts 498 will close when coil 494 is next operated from the FIG. 6 condition, and will stay closed despite the de-energization of coil 494. The next pulse of current to coil 494 will restore the rocker arm to the left, and again allow contacts 498 to open as shown.

Omitting the repetition of parts already fully described above, the operation of FIG. 6 will now be described. The student in this case is receiving instructions over a line from an instructor (like FIG. 1), or he may merely be practicing diction, pronunciation or the like. Also, he may be any person desiring to record a shorter or longer speech of any kind, for playback immediately or after any desired delay. With the capstan turning, the operator moves handle 490 to the left, connecting the erase oscillator 468 to erase head 438, and lighting lamp 462 (over contacts 493) to signal to himself that he has done so. However, before these contacts close, arm 486 will have been turned clockwise sufficiently to engage roller 422 against the tape, and it against the capstan, and tape will feed downward into the bin or in a free festoon. Stop or abutment 419 on the tape will move away from arm 423 (the stop may be weighty, if necessary), but the opening of the circuit of coil 494 merely allows its armature 496 to rise, and contacts 498 remain open. The operator talks into microphone 414, and his signals are recorded on the tape, via amplifier 466, at recording head 442. It is obvious that the tension of spring drive 510 must be less than that applied by capstan 420 to drive the tape, but sufficient to "yank" the tape back through guide rollers 506 and past the pressure shoe 400 when the capstan is not driving.

When the operator has completed his dictation or a response, in the case of instructional uses, he has two options. If he desires immediate playback, he releases handle 490, removing the drive contact at capstan 420 and allowing reel 508 to yank the tape back to its FIG. 6 condition. When the stop engages arm 423 and completes the circuit to coil 494, armature 496 swings clockwise and closes contacts 498 to complete a circuit from + at the contacts of relay 502, through the normally closed back contact, and thence to solenoid 500, which is connected to arm 486. The arm swings clockwise under the drive of the solenoid, and roller 422 again causes the tape to feed downward. This time, however, contacts 492 have not been closed, and the erase oscillator is not energized. The signals from tape 418 pass reproducer head 446 and to the headphones 412 (or speaker) via the usual amplifier 464.

As soon as amplified playback signals reach relay 502, it is energized, and the circuit to the solenoid 500 is maintained over the direct connection shown. Solenoid 500 may be momentarily de-energized as the contacts of relay 502 effect the transfer, but the dashpot 504 prevents the interruption of the drive engagement of roller 422 with the tape. Thus the reproducing operation is maintained as long as signals are received from the just previously recorded tape. The opening of contacts at 423 has no effect, as armature 496 merely releases, rocker arm 495 keeping the clockwise position. Shortly after the cessation of signals from tape 418, that is, after the release-time of relay 502 (which is slow to release, with a timing somewhat greater than the longest syllabic pause), the relay releases, and opens the circuit of solenoid 500. A short amount of tape may continue past the heads, but since there is no more signal, the instant roller 422 releases its grip on the tape, spring drive 510 again yanks the tape to its rest position, and switch 423 closes the circuit to the coil 494 of the latch relay, swinging the rocker arm left and opening contacts 498. This action occurs so rapidly because of the tension of spring 510, that the contacts 498 open before the closing of the back contacts of relay 502 can re-establish the circuit to solenoid 500 for a sufficient time to overcome the inertia of dashpot 504 in the "engage" direction of arm 486. A lost-motion connection between the dashpot and arm 486, or between the core of solenoid 500 and the arm, or the like, can readily be substituted for the critical adjustment of these timing factors, as will be obvious.

If the operator does not wish immediate playback of the sounds he has recorded, he need only hold handle 490 to the left following the completion of his dictation. The capstan will continue to feed tape from the reel 508, to whose hub the end of the tape is firmly connected, until all the tape provided has been fed past the capstan, whereupon the capstan will slip on the tape. Whenever the operator chooses, return of handle 490 will initiate the rewind and playback of the tape as already described. It would be an obvious device to provide a releasable latch for handle 490 in the leftward position, in cases where delayed playback of considerable periods may be desired; such is indicated diagrammatically at 520. Also, repeated playback without erasure could be obtained, by interrupting the erase coil circuit at switch 569.

*Programmed Master Tape Operation*

Figure 7:
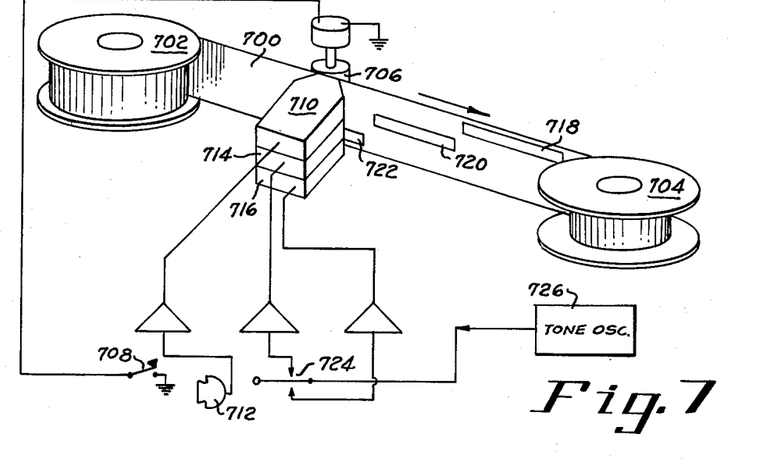
FIG. 7 is a perspective view of a master recording machine for producing a record tape of a type including both instruction material and control signals for the timing of response and review operations.
Figure 8:
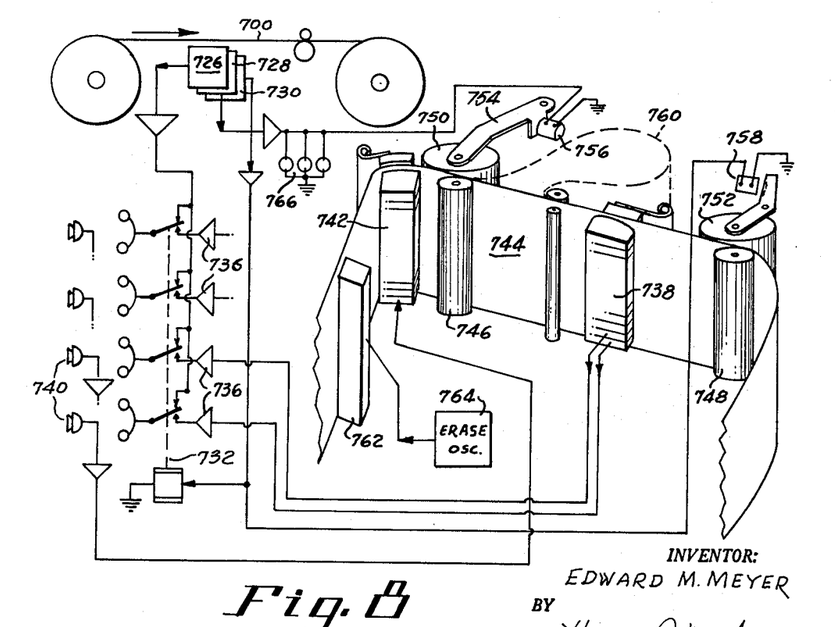
FIG. 8 is a perspective view of a complete language teaching laboratory having a master playback machine for the tape prepared as in the equipment of FIG. 7, together with a multiple-unit response and review apparatus capable of serving any desired number of students.

FIGS. 7 and 8 illustrate diagrammatically a further modification of the system according to the invention, in which a programmed master tape provides both the instruction material and signals which define the desired response and review intervals, especially for use where a single playback machine provides instant-review facilities for plural students. FIG. 7 illustrates a preferred form of such a master tape undergoing preparation in a special form of master-tape recording machine. Magnetic tape 700, wide enough to accomodate three side-by-side signal tracks, is fed from the usual supply spool 702 to take-up spool 704. The constant-speed drive is indicated by the capstan 706 driven by a motor via a control circuit including the instructor's switch 708, but equivalent capstan-moving or pressure-roller control could be employed if desired.

Three stacked recording heads are provided, the upper head 710 being powered by the instructor's microphone 712 through a suitable amplifier. The next lower head 714 serves to put on the middle track position any kind of signal, such as a tone signal, successive pulses, or the like to register on the tape a first control signal whose length will later control apparatus to provide the proper response time for a group of students. The lowermost head 716 records a similar control signal on the lowest track. For the tape motion direction indicated, a typical instructor's speech record is indicated at 718, while 720 and 722 designate the control signals, each being at least as long as will correspond to the time required for the response, which should (in the ordinary case of reproduction at the same tape speed as the recording), also be about equal to the time required for review or playback of the response. These control signals are shown as being recorded by the manipulation of a three-position switch 724 at the instructor's station. The center position disconnects the tone signal oscillator 726 from both heads 714 and 716, while the end positions connected the oscillator in turn to these two heads. By means of a watch or the like, the instructor, conveniently during the recital of the part of his instructions which is to be repeated, notes the duration of such part, and immediately following completion of that part operates switch 724 "up" to connect the tone source to head 714 for an equal time, and then operates the switch "down" for an again equivalent time. He then centers the switch, and commences the next instruction; or, if inconvenient to do so at once, may stop the tape by opening switch 708 until such time as he is ready to proceed.

An automatically timed system for producing these control tracks on the master tape will be described below, but for the present the use of the tape 700 will be described in connection with FIG. 8. Herein, the tape 700 is shown as being reproduced in a playback machine including three stacked playback heads 726, 728 and 730, shown staggered only to permit them all to be visible in the drawing. Usual tape feed and take-up facilities for this tape are shown but not described in detail since they may be otherwise conventional. Instruction playback head 726 feeds its signals through a conventional amplifier and thence through the normally-closed or back contacts of a multi-pole two-position relay 732 to the individual student headphones 734, as shown in FIG. 8. Relay 732 is connected for operation by the amplified signals on the lowermost tone track of tape 700, such as shown in FIG. 7 at 722, the output of head 730 being conventionally amplified (and rectified, if a D.C. relay is employed) as indicated. When relay 732 is thus operated, the headphones are respectively connected through the relay normally open or front contacts to individual student playback amplifiers such as 736, individually supplied with playback (review) signals from the individual stacked reproducing heads 738. Each student is also provided with a microphone, as at 740, and these are individually connected to the respective stacked recording heads 742 through respective amplifiers as shown.

A tape or band of magnetic recording material 744 is provided for recording all of the students' responses in this form of the invention, and is moved from a supply spool to a take-up spool, not shown but of ordinary construction. The tape 744 is wide enough to provide an individual track for each student to be accommodated, each such track cooperating with an individual student's head in the recording and playback stacks. Usual pressure shoes for the stacked heads are indicated, and necessary guide rollers or the like to permit the free-loop operation as more fully described above. This form of the invention illustrates the use of separate drive capstans 746 and 748 for the tape, as a variant of the single-capstan and diametrically-opposed pressure rollers of FIGS. 1 and 3. As will appear, the particular form chosen for moving the tape in the desired way will depend on the circumstances, the operating principle being the same in either case.

In this form, capstans 746 and 748 are both constantly driven at the proper speed by motors (not shown in this figure) but which do not propel the tape unless one or the other of the idler pressure rolls 750 and 752 is moved to press the tape against a capstan. Pressure roll 750 is, for example, mounted on a bracket 754 for bodily movement parallel to its own axis toward and away from tape 744, as by the energization of a solenoid 756, acting against the tension of a bracket spring. Roller 752 is similarly operated by a solenoid 758. When solenoid 756 is energized, the wide tape 744 feeds into the free or storage loop 760, while when solenoid 758 is energized, the tape is fed out of the free loop, if any, or is fed past both the recorder stack 742 and the reproducer stack 738. An erase head or stack 762 is shown in advance of the recorder stack, connected to the erase oscillator 764 as usual; this circuit may be opened, or the oscillator de-energized, if the tape is to be preserved for later review of the responses.

*Operation of the FIG. 8 Embodiment*

With instruction and control tape 700 in operation, instruction signals (such as at 718 in FIG. 7) will be reproduced through head 726 and delivered to all of the student headphones, relay 732 being at this time non-operated as there is no signal passing head 730. Wide tape 744 is also stationary, since the absence of tone signals from this portion of the second and third tracks of tape 700 leaves solenoids 756 and 758 de-energized. After the instruction (signals 718) has been completed, the tone signal 720 on the second track commences to pass pickup or head 728, and is amplified to energize solenoid 756, which brings roller 750 against the tape and feeds it out into the free or storage loop 760. At the same instant, the amplified voltage from head 728 is, or may be, applied to a set of signal lamps 766, one at each student's position, notifying them that the responses can now be given. The length of tone track 720 is gauged to permit the proper time for responses, and hence the proper feed-out of tape into loop 760. As the students make their responses, their microphones 740 carry their voice signals through the indicated amplifiers and to their respective recording heads in stack 742, so that the responses are all recorded on the tape in loop 760.

When tone track signal 720 has completed its passage over head 728, solenoid 756 is de-energized, and the lamps 766 go out. As soon thereafter as the second tone signal (722 in FIG. 7) commences to pass head 730 of FIG. 8, the signal is amplified and operates relay 732, thus disconnecting the students' headphones from the head 726 and connecting them to the outputs of the respective amplifiers 736. At the same time, solenoid 758 is energized (from the same amplifier as was relay 732), and pressure roller 752 presses the tape against capstan 748 to feed the wide tape 744 over the stack of playback heads 738. Each student's response is thus transmitted to his own headphones for review thereof. The length of tone signal 722 is such (approximately the same as that of tone track signal 720) as to provide the proper time for complete individual review of his responses by each student.

Upon cessation of signals from portion 722, the tape 744 again is made stationary by release of solenoid 758, and relay 732 is de-energized to reconnect the students' headphones to playback head 726, ready to receive the next instruction signals from the top track of tape 700.

*Automatic Timer for Making the Control Tape*

Figure 9:
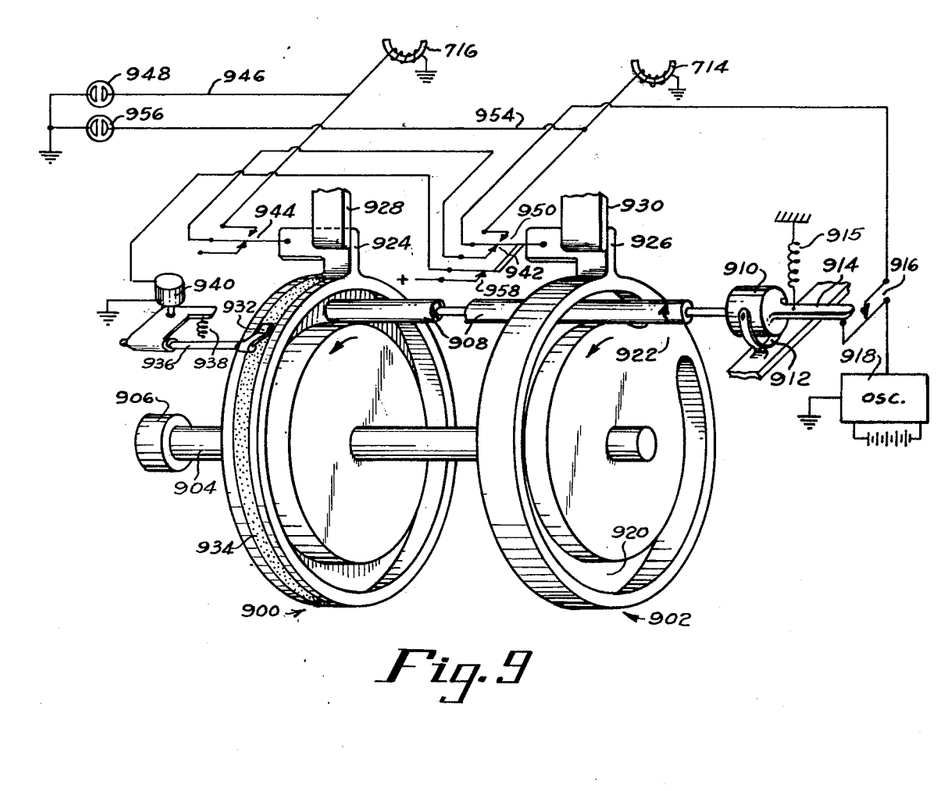
FIG. 9 is a schematic view, in exploded form, of a modification of parts of the FIG. 8 system, to accomplish automatic control of the length of the response and review time-control tracks.

While it is perfectly feasible to prepare the instruction and control tapes (such as 700) as already described, the making of accurate-length control track signals 720 and 722 is distracting to the one dictating the instruction material, and the job can only with difficulty be divided between two persons. FIG. 9 of the drawings shows in exploded and partly schematic form a timer which greatly simplifies the job. Bearing in mind that such a timer has to be capable of recording a certain time interval, and then after its completion operate two different devices (heads 714 and 716) for that interval, but in succession, it will be realized that the requirements for the timer are difficult and specialized ones. This is especially so when it is considered that the tape preparation may have to allow for any unavoidable spacing between the recording and playback heads of a particular student-machine.

The timer of FIG. 9 includes two independently rotatable discs 900 and 902, both freely rotatable as upon a shaft 904 carried by a fixed support 906. Both discs have inner and outer cylindrical drive surfaces by which they can be frictionally driven in either of their two rotational directions by a friction spindle 908 connected for rotation by a constantly-rotating and constant-speed timer motor 910. Timer motor 910 is shown as pivoted for rotation on a fixed bracket 912 by means of a handle 914, and spring-urged at 915 in the direction which brings the spindle 908 into contact with the inner drive surfaces of the discs, as shown in the figure. A normally closed switch 916 is arranged to be opened when the handle 914 is depressed to bring the drive spindle into contact with the outer drive surfaces of the discs. The switch controls the application of control signals from an oscillator or like tone source (or pulse source) 918, to one or another of the recording heads 714 and 716 which are the same heads as those so numbered in FIG. 7 of the drawings.

Since the drive spindle 908 has to pass through disc 902 to reach disc 900, disc 902 is formed with an open slot 920, and the integrality of the disc is preserved by a web or "spoke" portion 922, which merely restricts the rotation of disc 902 to less than one full revolution. The spindle 908 need not pass through disc 900, so the latter is shown as a shallow dish with the cylindrical facing walls forming the two drive surfaces for engagement by the drive spindle. Subject only to the restraining effect of a pawl-like brake shoe to be described, in the normal condition shown in FIG. 9 the spindle 908 engages the inner drive surfaces of both discs, and has restored both discs to their zero-time positions as shown, wherein radial projections 924 and 926 thereof have encountered fixed stop lugs 928 and 930 respectively. The tension of the motor-pivot spring 915, and the frictional contact between the drive spindle and the two discs are adjusted so that with motor 910 constantly running, the spindle 908 can slip idly on the inner drive surfaces of the disc, holding them both against their stops. A portion of the radial projection of each disc is arranged to operate a respective set of electrical contacts, to be described, at the time the stop is reached.

It will be apparent from the foregoing that if the handle 914 is depressed to pivot the motor 910, spindle 908 will leave both of the inner drive surfaces of the discs, and encounter the outer drive surfaces thereof, and thus rotate the discs in the direction opposite to the arrows marked on such discs. The arrows indicate the restoretoward-zero direction of disc rotation. With the motor pivoted as described, both discs will move away from their zero positions for an angular distance proportional to the length of time that the handle is thus depressed. When the handle 914 is released, the drive spindle 908 will return to the position shown, and its engagement with the inner drive surfaces will commence to urge both discs back towards their zero positions. By making the diameter of the spindle small in comparison to the diameters of the drive surfaces of the discs, the difference in disc speed in the forward and reverse directions can be made as small as desired, so that the interval of reverse rotation towards the zero positions can be made closely equal to the interval during which the handle 914 was depressed. It is obvious that by including the complications of certain gearing, these intervals could, if necessary, be made precisely equal. The arrangement shown automatically provides a slightly longer time for the student response than the instructor required to dictate the material, which may be desirable for teaching applications.

When the handle is released as described, disc 900 at once commences its return motion, but the return motion of disc 900 is prevented by the engagement of a pawl-like brake element 932 which rubs against a frictional surface (rubber or the like) 934 on the disc periphery. Brake element 932 is operative only to impede reverse rotation of disc 900 (i.e., in the back-to-zero direction), because of the jam angle at which it lies with respect to the surface 934. The brake element is connected to a shaft 936 and spring-urged in the braking direction as at 938. A solenoid magnet 940 is positioned and connected relative to a crank arm portion secured to the shaft of the brake element, so as to lift the same upwardly, against the tension of spring 938, when the magnet is energized, and thus allow retrograde motion of disc 900 only at the proper time.

It will be noted that the circuit or conductor for tone signals from the oscillator 918 extends through the normally closed contacts of switch 916, thence through normally closed contacts 942 of the switch operated by disc 902, and finally through normally open contacts 944 of the switch that is operated by disc 900, to recording head 716. A branch conductor 946 applies the oscillator output to a signal lamp (such as a neon lamp, for example) 948 located for view by the operator. A normally open set of contacts 950 of the switch operated by disc 902 will, when the disc leaves its zero position, connect the tone source 918 directly to the recording head 714, and also over a branch conductor 954 to the lamp 956. The operator will thus be advised of the times during which the control tones are being applied to the tape 700, and when both lamps have gone out, is advised that he may commence to dictate the next instruction. Obviously, other signal systems, for example requiring only one lamp, could be substituted.

*Operation of the Automatic Timer*

With the parts in the condition shown in FIG. 9, and with the recorder operating to feed tape 700 over the recording heads in FIG. 7 (as now modified by the inclusion of the timer), the operator or instructor records his material as desired, terminating with a recitation of the material to be repeated by the students. As he begins this "to-be-repeated" material, he depresses the handle 914, and when he completes that part of the dictation, releases the handle. The result is that while he has been dictating the material that is to be repeated by students, spindle 908 has been in engagement with the outer drive surfaces of both discs, and moves them both opposite to the direction of their arrows for a time equal to the duration of that material. However, while handle 914 is held depressed, switch 916 prevents any signals from the source 918 from reaching the control signal heads. As each disc moves away from its zero-time position, the respective disc-operated switches are operated, and the closure of contacts 950 prepares a tone circuit from source 918 to head 714, but which is interrupted at switch 916 until the handle 914 is released. The opening of contacts 942 also interrupts the circuit from the tone source 918 to head 716, even though the contacts 944 closed as soon as disc 900 moved away from its zero position.

When the operator releases handle 914, the spindle 908 again comes into contact with the inner drive surfaces of both discs, and commences to restore them toward the zero position. However, since the circuit of solenoid 940 is then open at contacts 958 of disc 902, the pivoted brake element 932 is pressed against the friction surface 934 of disc 900, and restrains the latter from such reverse rotation until the solenoid circuit is energized as an incident to the complete return-to-zero of disc 902 to close contacts 958. It follows that only disc 902 begins to rotate back when handle 914 is released; and since the release thereof closes contacts 916, tone signal is applied to head 714 so long as contacts 950 are held closed; that is, until disc 902 is fully returned to zero. That tone signal is then interrupted by the opening of contacts 950. At the same instant, the closure of contacts 958 energizes the solenoid 940, which lifts brake element 932 away from the disc 900, and spindle 908 no longer merely slips on the inner drive surface of that disc, but frictionally rotates it, in its turn, back towards zero. Contacts 944 being closed during this interval, and contacts 942 being closed also, the tone signal is now applied to head 716, and continues to be so applied until disc 900 reaches the zero position and opens contacts 944 again.

The parts are thus restored to the FIG. 9 condition ready for the next depression of handle 914, and the operator is so advised by the extinguishment of both warning lamps 948 and 956.

Other and equivalent ways of accomplishing this specialized dual timing function can readily be devised by those skilled in the art in the light of the above example, and it is not intended by this example to limit the scope of the invention, either as to the timer or as to the systems disclosed in connection with the other embodiments described herein.

Moreover, it is not intended by the use of certain exemplary or typical sequences (such as instruction—student response—student playback) to imply that other sequences may not be equally useful or even superior for these or like purposes. For example, the sequence might provide for the instruction material, student response, repeat of instruction example, and only then the playback of the student response; or for a repetition of the original instruction after any of the student playback reviews. The apparatus described herein can readily be modified, in accordance with its basic principles, to provide such various sequences as may be desired.

While certain forms of the apparatus have employed a single drive capstan with pressure rollers mounted for movement relative thereto, it is equally possible to maintain the pressure rollers on fixed axes, and to move the capstan itself from one to the other, either along a line joining the centers of the rollers, or by a lateral motion in a path to one side of that line. The motor carrying the capstan may itself, for example, be pivoted from a centered position to a roller-engaging position.

Similarly, and while for purposes of making the drawings perfectly clear, the spacing between certain parts has been exaggerated, such as between the recording and playback heads in FIG. 1, such spacing may be greatly reduced by proper head design and like expedients; but in any case the fact that some space may remain can easily be allowed for in the programming of the master tape sequences, or the timing of oral "live" instructions, or by incorporating compensating time delays in the operating components. All such variations will be obvious to those familiar with the sound recording art.

What is claimed is:

1. Immediate playback sound recording and reproducing apparatus comprising spaced-apart recording and reproducing heads, a lengthy flexible recording medium extending past both said heads, a single drive capstan, means engageable with said medium at a first point between said heads for urging said medium against said capstan and thereby feeding the medium past said recording head and into a free loop between said heads, and means engageable with said medium at a point following said reproducing head for urging said medium against said capstan and thereby feeding said medium past said reproducing head.

2. Apparatus in accordance with claim 1, including means for selectively operating said two engageable means into feeding engagement with said medium.

3. Apparatus in accordance with claim 1, including means for operating said two engageable means into and out of feeding engagement with said medium in an alternating sequence.

4. Immediate playback sound recording and reproducing equipment comprising closely spaced recording and reproducing heads, a single drive capstan, a lengthy flexible record medium extending past both said heads, first feeding means comprising a movable pressure roller engageable with said medium at a point following said reproducing head, second feeding means comprising a movable pressure roller engageable with said medium at a point between said heads, and means for selectively engaging said two pressure rollers with said medium in alternating sequence, to bring the medium selectively into driven relation to said capstan.

5. Apparatus in accordance with claim 4, including frictional feed-retarding means disposed in advance of said reproducing head for engagement with said medium.

References Cited in the file of this patent

UNITED STATES PATENTS

| | | |
|---|---|---|
| 2,606,253 | Somers | Aug. 5, 1952 |
| 2,777,901 | Dostert | Jan. 15, 1957 |
| 2,816,161 | Glaser et al. | Dec. 10, 1957 |
| 2,911,482 | Dostert | Nov. 3, 1959 |
| 2,944,116 | Vershoven | July 5, 1960 |
| 2,946,863 | Holzer | July 26, 1960 |
| 2,989,594 | McKaig | June 20, 1961 |

OTHER REFERENCES

IBM Technical Disclosure Bulletin, vol. 2, No. 3, October 1959, page 6.